United States Patent
Aalto et al.

[11] Patent Number: 5,220,910
[45] Date of Patent: Jun. 22, 1993

[54] DEVICE AND METHOD FOR VENTILATION

[75] Inventors: Erkki Aalto, Kausala; Teuvo Pellinen, Villahde; Pekka Kyllonen, Lahti, all of Finland

[73] Assignee: Halton OY, Finland
[21] Appl. No.: 768,858
[22] PCT Filed: Jan. 30, 1991
[86] PCT No.: PCT/FI91/00029
 § 371 Date: Sep. 25, 1991
 § 102(e) Date: Sep. 25, 1991
[87] PCT Pub. No.: WO91/11271
 PCT Pub. Date: Aug. 8, 1991

[30] Foreign Application Priority Data

Jan. 31, 1990 [FI] Finland ............... 900494

[51] Int. Cl.⁵ ................................ F24C 15/20
[52] U.S. Cl. ..................... 126/299 R; 126/299 D; 454/66
[58] Field of Search ....... 126/299 R, 299 D, 301–303, 126/21 R; 55/DIG. 36; 98/115.1, 1.36, 115.3; 454/49, 57, 66

[56] References Cited

U.S. PATENT DOCUMENTS

| | | | |
|---|---|---|---|
| 2,481,341 | 9/1949 | Pledger | 126/299 D |
| 3,217,629 | 11/1965 | Ekern | 126/299 D |
| 3,530,784 | 9/1970 | Courchesne | 126/299 D |
| 3,890,887 | 6/1975 | Kaufman | 126/299 D |
| 4,541,409 | 9/1985 | Karst et al. | 126/299 D |

FOREIGN PATENT DOCUMENTS

| | | | |
|---|---|---|---|
| 3601864 | 7/1987 | Fed. Rep. of Germany | 126/299 D |
| 74799 | 11/1987 | Finland . | |
| 31544 | 3/1977 | Japan | 126/299 R |
| 65529 | 4/1982 | Japan | 126/299 D |

Primary Examiner—James C. Yeung
Attorney, Agent, or Firm—Steinberg & Raskin

[57] ABSTRACT

The invention concerns a ventilation device, through which impure air is removed out of a room, in particular out of the proximity of a source of impurities at a working point in the room space. According to the invention, through the device, besides the removal of impure air and/or excess heat from the source of impurities as a limited-area removal, air of general removal is also removed through the device, the suction opening for general removal being preferably opened into the same exhaust chamber into which the suction opening for the space for collecting of impurities in the interior of, for example, a kitchen hood is opened. The device may also include a flow opening for the general intake. Thus, the device can operate as a device for limited-area ventilation and for general ventilation serving for the whole room.

12 Claims, 4 Drawing Sheets

5,220,910

DEVICE AND METHOD FOR VENTILATION

The invention concerns a device and a method for ventilation.

BACKGROUND OF THE INVENTION

From the applicant's FI Patent No. 74,799 of earlier date, an intake and exhaust air device is known wherein the intake air is made to flow into the zone of stay of a person working at a working point. Air is removed through the device so that impurities coming from a source of impurities at the working point are first sucked into an interior hood space in a kitchen hood and from said space through fat filters into the outlet duct.

Correspondingly, from the U.S. Pat. No. 4,072,143, a solution of equipment is known wherein air heated by the stove is removed through a central construction of ducts in a hood.

The prior-art solutions of equipment serve either for ventilation at a specific site or for general ventilation alone. Thus, the prior-art solutions of equipment have not been suitable both for removal of air from a limited site and for general removal of air. In the present invention, attempts have been made to find an improvement for said deficiency involved in prior art.

OBJECTS AND SUMMARY OF THE INVENTION

In the most general embodiment of the invention, a ventilation device is formed through which air is introduced at least as a carrier air jet, which induces carriage of impurities towards the exhaust duct. A duct for general ventilation is arranged to open into an exhaust air chamber. In this manner, through the device, both impurities and/or excessive heat arising at the working point are removed through removal out of a limited area. In addition, air is removed as general removal as the device includes an opening for general ventilation into the exhaust air chamber to pass a flow of exhaust air flow for general ventilation into the exhaust duct.

In an embodiment of the invention, besides an exhaust opening for contaminated air placed inside the hood construction, the device also includes an exhaust opening for general ventilation. Through said exhaust openings, the flow sucked by means of a blower is removed through an exhaust duct common of the exhaust air flows. In a corresponding way, an intake air flow is accomplished by means of the device so that the flows are substantially equally large, in which case no changes need to be made in the overall ventilation. Thus, the adjustment of the general ventilation entering into the room need not be changed, nor does the adjustment of the air flow in the exhaust duct have to be changed.

In all of the prior-art solutions, mentioned above, the exchange of the air in a room is accomplished so that the exhaust air of general ventilation out of the room is sucked through a separate exhaust duct opening into the room. In a corresponding way, air for general ventilation is introduced into the room through a separate intake air duct. In particular in the case of new investments, when new hood constructions are fitted in existing rooms, the general ventilation of the whole room space must be re-adjusted in consideration of the changes in air quantities in the intake air and in the exhaust air caused by the new hood construction. Thus, in the present application, attempts have been made to find a solution for said problem.

In another embodiment of the invention, the intake and exhaust air device so that the amount of air introduced into a room space through the device has been designed is equal to the amount of air removed out of the room through the device.

The device in accordance with the invention may operate as a device of general ventilation for the whole room space. In this manner through the kitchen hood it is possible to introduce all the fresh air to be blown into the room, and through said kitchen hood it is possible to remove all the exhaust air to be removed out of the room.

The device in accordance with the invention is mainly characterized in that the equipment includes a second exhaust air opening, which opens into the exhaust air chamber. The second exhaust air opening is meant for general ventilation, and opens into the room space from the side of the frame. Exhaust air of general ventilation of the room space is sucked through the second exhaust air opening into the exhaust air chamber and further into the exhaust air duct.

The ventilation method in accordance with the invention is mainly characterized in that in the method, exhaust air of general ventilation is removed through the same ventilation device.

BRIEF DESCRIPTION OF THE DRAWINGS

The invention will be described in the following with reference to some preferred embodiments of the invention illustrated in the figures in the accompanying drawings, the invention being, yet, not supposed to be confined to said embodiments alone.

DETAILED DESCRIPTION OF THE INVENTION

Figure 1A:
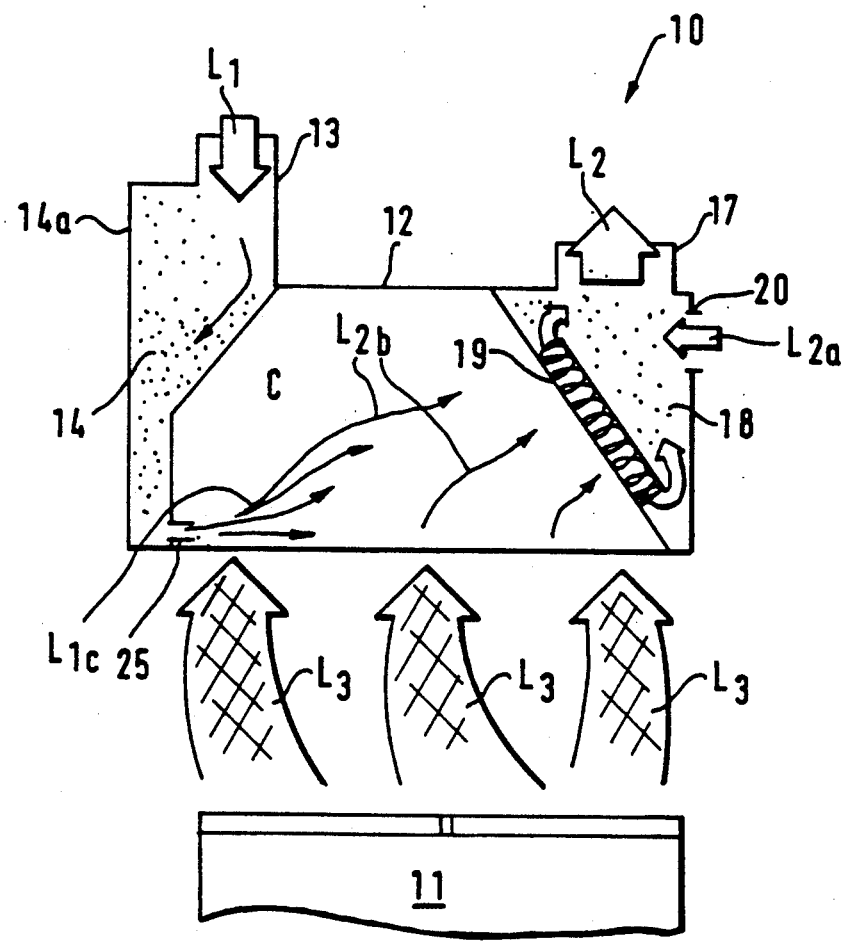
FIG. 1A shows a first embodiment of the invention, a kitchen hood solution.

FIG. 1A shows a first preferred embodiment of the invention. The ventilation device 10 is a kitchen hood, which is fitted, e.g., above a kitchen stove 11. The hood is shown as a schematic sectional view. The kitchen hood shown in the figure comprises a frame 12 and a space C for collecting of impurities, which space is defined by the frame 12 in its interior and opens down towards the sources 11 of impurities shown in the figure. The device 10 comprises an intake air duct 13 for intake air. Through a blower, not shown, air is made to flow out of the intake air duct 13 into an intake air chamber 14 confined in the frame 12 and defined by the walls 14a.

In this embodiment of the invention, the air is made to flow out of the intake air chamber 14 as a carrier air jet in the way indicated by the arrow $L_{1C}$. The carrier air jet $L_{1C}$ is made to flow through the openings 25 in the collector space C so that the carrier air jet $L_{1C}$ attracts the more impure air and/or excess heat coming from the source 11 of impurities. The carrier air jet is directed across the space C for collecting of impurities, placed inside the hood, towards the exhaust air opening (arrow $L_{2B}$), through which it flows into the exhaust air chamber 18. Moreover, in this embodiment shown in the figure, into the exhaust air chamber 18, an exhaust air opening 20 is opened for general ventilation, and said exhaust air flow for general ventilation is indicated in the figure by the arrow $L_{2A}$. The exhaust air flow $L_2$ is passed out of the exhaust air chamber 18 into the exhaust air duct 17 and out of connection with the device. The supply of air into connection with the device through the duct 13 is illustrated by the arrow $L_1$. the air of higher impurity and/or of excessively high temperature, collected and rising from the source of impurities and/or from the source of excessive heat, is indicated in the figure by the reference arrows $L_3$.

Figure 1B:
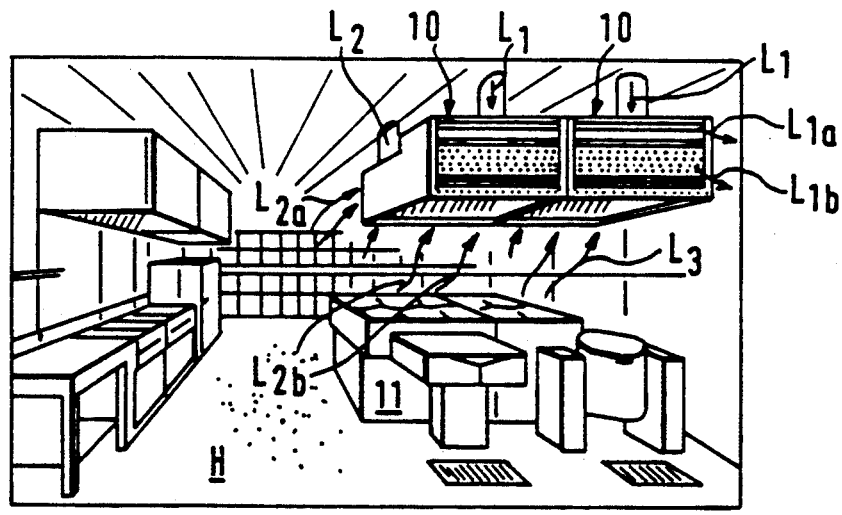
FIG. 1B is an axonometric view of a kitchen space and of the intake and exhaust air devices in accordance with the invention installed in the kitchen space.

In FIG. 1B, the kitchen space is shown as an axonometric view. In the room space H, two limited-area air-exhaust devices 10 in accordance with the invention have been installed. They have been fitted above the sources of excessive heat and impurities in the kitchen space shown in the figure, such as, above the kitchen stove 11.

Through the intake and exhaust air device 10 in accordance with the invention, fresh air of general ventilation is introduced into the room. By means of the device in accordance with the invention, from inside the hood, substantially the same amount of air is removed as is introduced into the room space by means of the device. Intake air can be distributed into the room space through the duct opening for general ventilation and/or through the duct opening for limited-area ventilation. In such a case, it is possible to remove an exhaust air quantity out of the room that equals the amount of air that has been introduced through said duct openings or duct opening. In another embodiment, and the exhaust air flow may pass exclusively through the collector space C placed in the interior of the hood.

In one of its embodiments, the intake and exhaust air device comprises an intake air opening for general ventilation and/or an intake air opening for limited-area ventilation, an exhaust opening from the interior of the hood for more impure exhaust air and an exhaust opening from the side of the hood for the exhaust air of general ventilation. It is essential that the amount of air introduced into the room space through the device is substantially equal to the amount of air removed through the device.

As is shown in FIG. 1B, the overall ventilation of the room space H is carried out through the devices 10. Fresh air is introduced into the room space through the intake air duct 13, and the air is made to flow into the room space H in the way indicated by the arrows $L_{1a}$ and $L_{1b}$. The arrows $L_{1a}$ represent the flow of general ventilation, and the arrows $L_{1b}$ represent the limited-area flow of intake air into the zone of stay of the person working near the kitchen stove.

As is shown in the figure, the removal of air out of the room space H is accomplished through the hood constructions so that the intake and exhaust air device 10 in accordance with the invention includes a separate exhaust air duct for general ventilation. Thus, impure air is removed out of the room through the interior space C in the hood and through the fat filters in the way indicated by the arrows $L_{2b}$ in FIG. 1. Exhaust air of general ventilation of the room space is removed out of the room through the opening 20 (in FIG. 2) in the way indicated by the arrows $L_{2a}$.

Figure 2:
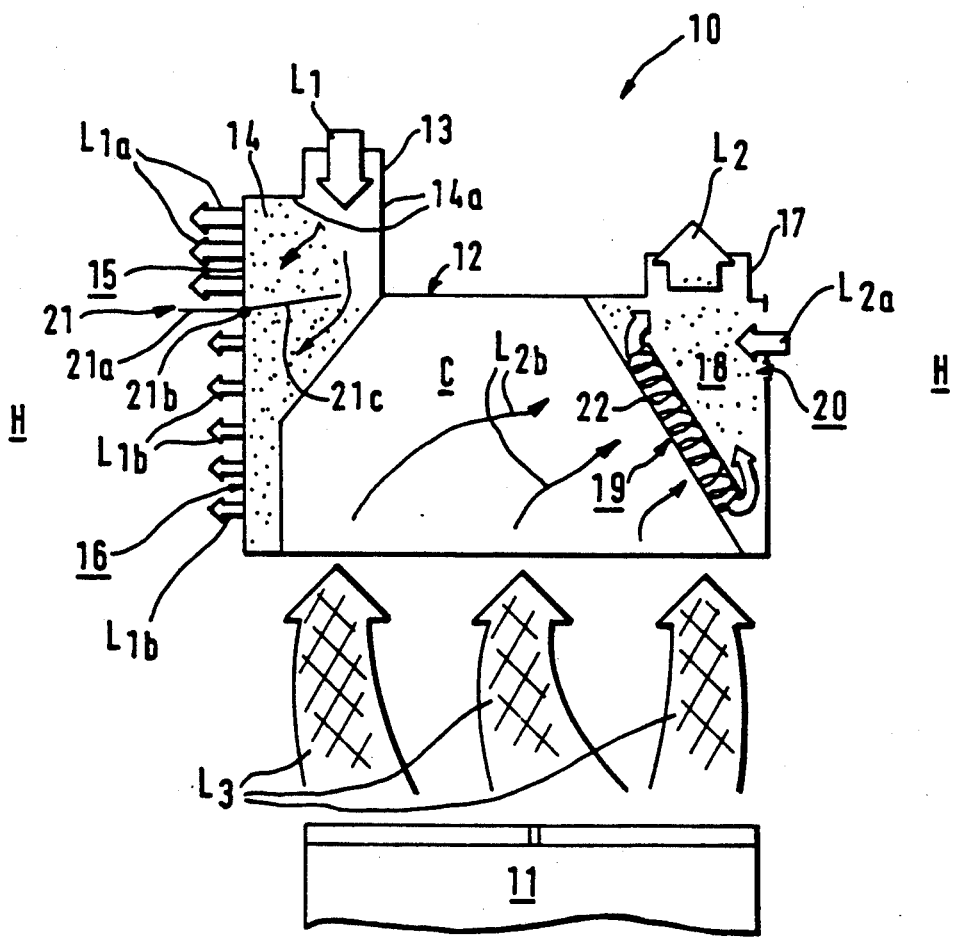
FIG. 2 is a sectional view of a limited-area air-exhaust device in accordance with the invention.

FIG. 2 is a sectional view of an intake and exhaust air device in accordance with the invention. As is shown in the figure, the kitchen hood comprises a frame 12 and a space C for collecting of impurities, which is confined in the interior of the frame and opens down towards the sources 11 of impurities shown in the figure.

The intake and exhaust air device 10 includes an intake air duct 13 for fresh intake air. Through a blower, not shown, air is made to flow out of the intake air duct 13 into an intake air chamber 14 inside the frame 12, which chamber is defined by the walls 14a. Out of the intake air chamber 14, air is made to flow into the room space H through at least one air discharge opening and, in the embodiment shown in FIG. 2, through a first air discharge opening 15 and a second air discharge opening 16.

Through the first air discharge opening 15, air is made to flow in the way indicated by the arrows $L_{1a}$, and said air flow operates as the intake air flow for general ventilation. Through the second air discharge opening 16, air is made to flow into the room space H in particular into the zone of stay of a person working at the proximity of the intake and exhaust air device 10. Said limited-area air flow is illustrated by the arrows $L_{1b}$.

The exhaust air flow through the intake and exhaust air device 10 is accomplished by means of the suction produced by a blower (not shown) through the exhaust air duct 17. The exhaust air duct 17 is opened into the exhaust air chamber 18. The exhaust air chamber comprises an exhaust air opening 19 and, in connection with it, fat filters 22. The exhaust air opening 19 is opened into the space C for collecting of impurities, placed inside the frame 12. The equipment further includes an exhaust opening 20 for general ventilation, which is opened into the exhaust chamber 18 and through which the exhaust air of general ventilation is sucked out of the room space H.

As is shown in FIG. 2, the equipment further includes a regulator 21 of the intake air flow in the intake air chamber 14. The regulator 21 comprises a handle 21a, a bearing 21b, and a regulation damper 21c. By turning the handle 21a, it is possible to set the regulation damper 21c in the intake air chamber into positions controlling the flow in different ways, and in this way the air quantities passed through the discharge openings 15 and 16 are affected. When the discharge opening 15 is closed, the discharge opening 16 is opened to a corresponding extent, and vice versa.

Figure 3:
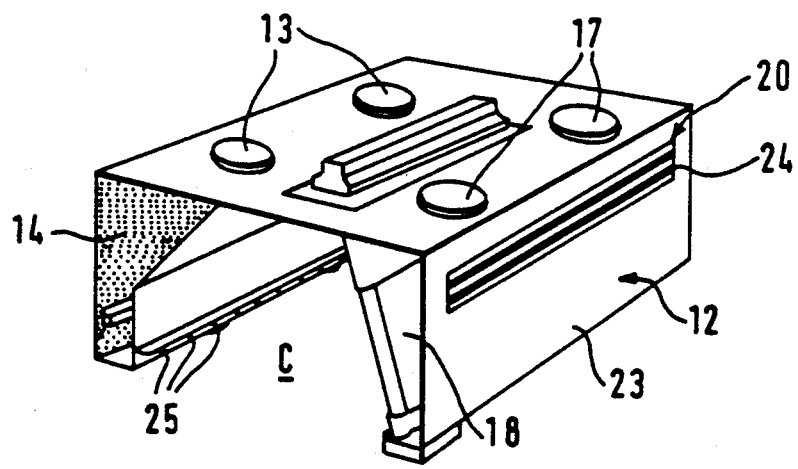
FIG. 3 is an axonometric view of a preferred embodiment of an intake and exhaust air device in accordance with the invention with the front plate removed.

FIG. 3 is an axonometric view of a second preferred embodiment of a kitchen hood construction in accordance with the invention, with the end plate removed. The air for the overall ventilation of the room space is passed into the room space through the intake ducts 13. The exhaust air for general ventilation is passed through the exhaust air opening 20 into the exhaust air chamber 18 and further into the exhaust air duct 17. On the vertical side wall 23 of the frame construction 12, an oblong exhaust air opening 20 for general ventilation is placed, said opening including a regulator 24 for the air flow. The equipment further includes flow openings 25 for the carrier air flow $L_{1c}$, which openings are opened into the interior space C in the hood and into the intake air chamber 14.

Figure 4:
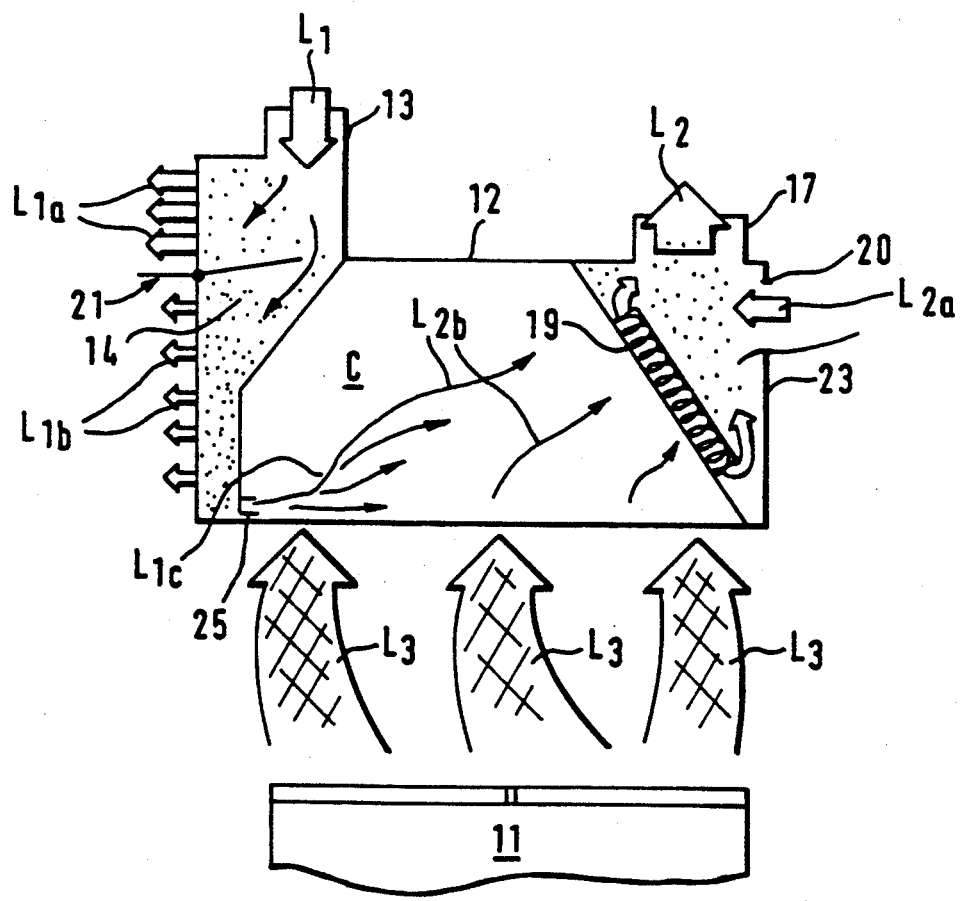
FIG. 4 shows an embodiment of a device in accordance with the invention which is provided with a carrier-air jet opening that opens into the intake-air chamber.

FIG. 4 is a more detailed illustration of the solution shown in FIG. 3. The openings 25 are opened into the intake air chamber 14. The air is made to flow as a carrier air jet $L_{1c}$ towards the fat filters 22 through the whole area C inside the hood. The carrier air jet $L_{1c}$ attracts efficiently the impure air $L_3$ rising from the source of impurities and operates as a carrier-air and trap air jet for said impure air, guiding said air further towards the fat filters 22 in the exhaust air chamber and further into the exhaust air chamber.

Figure 5:
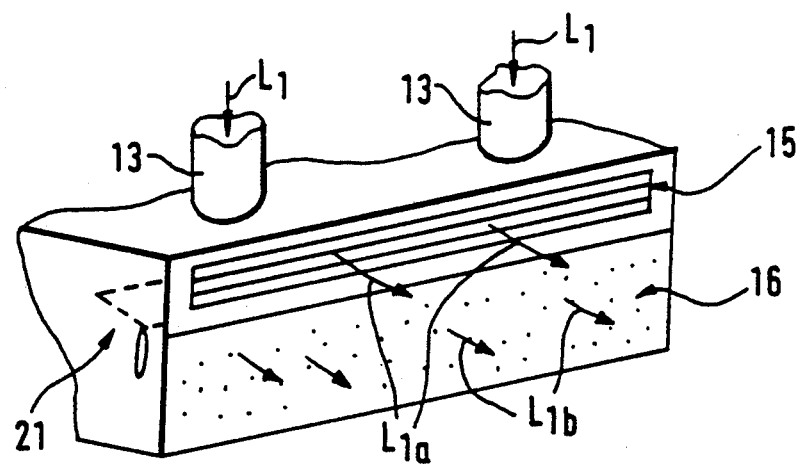
FIG. 5 shows the intake air side of an intake and exhaust air device in accordance with the invention, and therein the air discharge face for the intake air flow of general ventilation flowing into the room space as well as the air discharge face, for the limited-area air flow into the working zone of a person working at the proximity of the hood.

FIG. 5 is an axonometric view of the intake air side of the intake and exhaust air device in accordance with the invention. The air is made to flow into the intake air chamber in the way indicated by the arrows $L_1$ through the intake air ducts 13. The air is made to flow further into the room space through the first air discharge opening 15, meant for intake air of general ventilation, and through the second air discharge opening 16, meant for intake air of limited-area ventilation. The first air discharge opening 15 comprises oblong lattice parts. The amount of air discharged per unit of time through the discharge opening 15 is larger than that discharged through the discharge opening 16. The discharge opening 16 comprises a perforated face.

Figure 6:
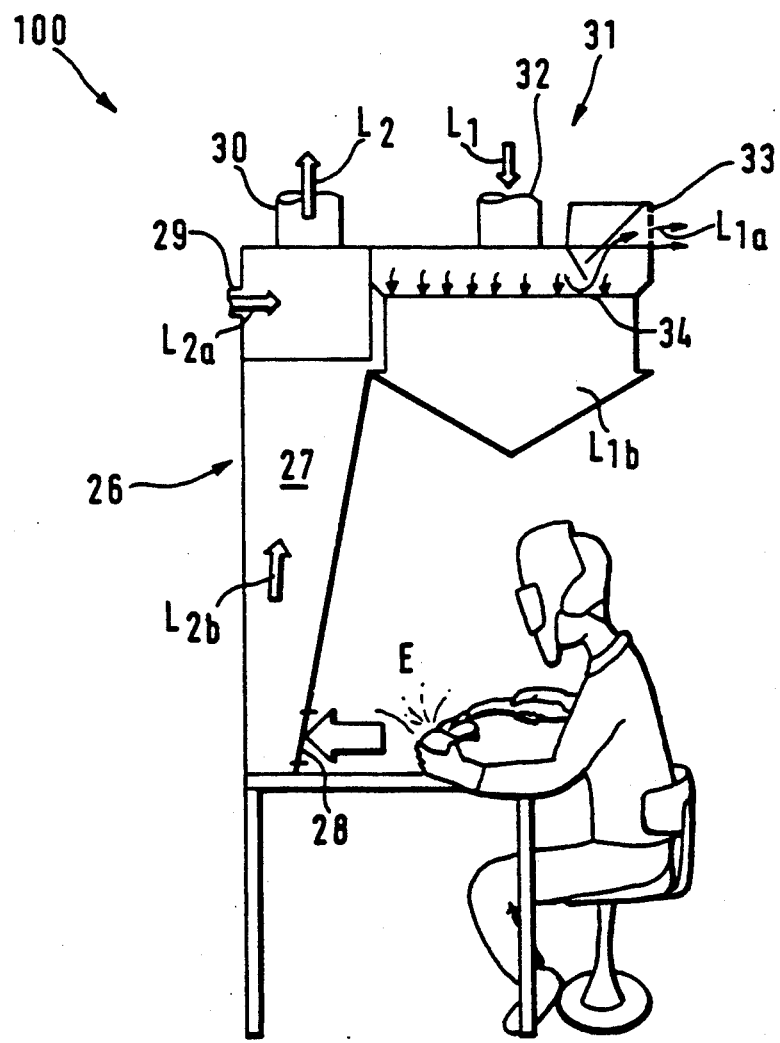
FIG. 6 shows a second embodiment of the device and the method in accordance with the invention, wherein the device removes air from the working point, from its source of impurities.

FIG. 6 shows an embodiment of the invention wherein contaminated air from the source of impurities at a working point or other impurities is removed by means of the ventilation device 100. The device 100 comprises a frame 26. In the most general embodiment shown in FIG. 6, the device comprises exclusively an exhaust duct opening 28 for general removal in respect of general ventilation. In a second embodiment shown in FIG. 6, for general ventilation, there is both an exhaust opening 29 for general ventilation and an intake air opening 33 for general intake. Inside the frame 26, there is an exhaust chamber 27 for exhaust air, into which the first exhaust opening 28 for exhaust air is opened at the proximity of the source of impurities and a second exhaust opening 29 for exhaust air, of general ventilation, the exhaust opening being opened into the room space H in a direction away from the source of impurities. By means of a blower (not shown), an exhaust air flow is produced through the exhaust duct 30.

The equipment further comprises a terminal member 31 for intake air, which comprises an intake air duct 32, through which the air is passed into the air discharge opening 33 for general ventilation and into the air discharge opening 34 for limited-area ventilation. Through the air discharge openings 34, fresh air is made to flow to above the working point, into the zone of stay of the person working at the working point.

By means of the device 100, an amount of intake air is passed into the room space that is equal to the amount of air removed through the device, or a larger amount of air is removed through the exhaust air opening (20, 29) than through the exhaust air opening (19, 28) meant for more impure air.

We claim:

1. An air intake and exhaust device comprising a frame comprising an intake air chamber, an exhaust air chamber, and a collection chamber structured and arranged to collect impure air from a source thereof, an intake air duct connected to said intake air chamber, said intake air duct structured and arranged to provide a flow of fresh air to said intake air chamber, said intake air chamber having a first air discharge opening structured and arranged to provide a flow of fresh air from said intake air chamber into a room space for general ventilation, said intake air chamber having a second air discharge opening structured and arranged to provide a flow of fresh air from said intake air chamber into said collection chamber, said exhaust air chamber having a first exhaust air opening, impure air located in said collection chamber flowing into said exhaust air chamber through said first exhaust air opening, an exhaust air duct connected to said exhaust air chamber, said exhaust air duct structured and arranged such that impure air in said exhaust air chamber is sucked therethrough, said exhaust air chamber having a second exhaust air opening structured and arranged such that air of general ventilation from the room space flows through said second exhaust air opening and is sucked into said exhaust air duct, said second air opening for general ventilation located in a top portion of a side of said frame, said second air opening being arranged such that air of general ventilation from the room space is sucked from a level as high as possible above the source of impurities in the room space, and regulator means arranged in said second exhaust air opening for regulating the amount of air of general ventilation flowing through said second exhaust air opening, such that the amount of air flowing through said intake air duct and said exhaust air duct are substantially equal.

2. Device as claimed in claim 1, wherein said collection chamber is a space for collecting impurities or excessive heat, said collection chamber being structured and arranged such that impurities or excess heat from a work area located in proximity to said collection chamber is sucked therethrough and into said exhaust air chamber.

3. Device as claimed in claim 2, wherein said intake air chamber and said exhaust air chamber are located at opposite sides of an interior of said frame, said second air discharge opening being arranged such that the flow of fresh air is directed through said collection chamber as a carrier air flow, thereby carrying impurities or excess heat in said collection chamber toward said first air exhaust opening.

4. Device as claimed in claim 3, wherein said intake air chamber further comprises a third air discharge opening arranged such that the flow of fresh air is discharged into the work area.

5. Device as claimed in claim 4, further comprising a regulator structured and arranged to regulate the amount of the fresh air flow discharged through said first air discharge opening and said third air discharge opening.

6. Device as claimed in claim 5, wherein said regulator comprises a regulation damper, said damper being structured and arranged to be moved to reduce the amount of fresh air flow entering into the room space through said first air discharge opening, and, at the same time, increasing the amount of fresh air flow entering into the work area through said third air discharge opening.

7. Device as claimed in claim 5, wherein said regulator comprises a regulation damper, said damper being structured and arranged to be moved to increase the amount of fresh air flow entering into the room space through said first air discharge opening, and, at the same time, reducing the amount of fresh air flow entering into the work area through said third air discharge opening.

8. Device as claimed in claim 5, whereby a larger quantity of fresh air is made to flow through said first air discharge opening than through said third air discharge opening via said regulator.

9. A method for ventilating a room space and a work area located in the room space which is a source of impure air, excessive heat, or both, comprising arranging an intake and exhaust air device above the work area, said intake and exhaust device having an outer frame and comprising an intake air chamber, an exhaust air chamber, and a collection chamber, collecting impure air from the work area in said collection chamber, attaching an intake air duct to said intake air chamber, and providing a flow of fresh air to said intake air chamber via said intake air duct, providing a flow of fresh air from said intake air chamber into a room space for general ventilation via a first air discharge opening in said intake air chamber, providing a flow of fresh air from said intake air chamber into said collection chamber via a second air discharge opening in said intake air chamber, causing impure air located in said collection chamber to flow into said exhaust air chamber via a said first exhaust air opening in said exhaust air chamber, sucking impure air located in said exhaust air chamber into an exhaust air duct connected to said exhaust air chamber, and sucking air of general ventialation from the room space through a second exhaust air opening in said exhaust air chamber into said exhaust air duct, and arranging said second exhaust air opening in a top portion of a side of said outer frame such that air of general ventilation from the room space is sucked from a level as high as possible above the source of impurities in the room space, regulating the amount of air flowing through said second exhaust air opening such that a substantially equal amount of air flows through said intake air duct and said exhaust air duct, whereby the intake air required for general ventilation of the room space is introduced into the room space through the same intake and exhaust air device through which the impure air produced at a source of impure air in the work area is removed, and exhaust air from the general ventilation of the room space is also removed through the same intake and exhaust air device.

10. The method as claimed in claim 9, further comprising dividing the flow of fresh air which flows into said air intake chamber into at least two air discharge openings that open toward the room space and the work area, and distributing a larger flow of said fresh air from said air intake chamber into the room space, and a smaller flow of fresh air to the work area, such that a larger air flow is provided for general ventilation than is provided for limited area ventilation.

11. The method as claimed in claim 9, further comprising providing the flow of fresh air through said second air discharge opening into said collection chamber as a carrier air jet across said collection chamber, thereby inducing impure air in said collection chamber to flow towards said first exhaust air opening of said exhaust air chamber and finally into said exhaust air duct.

12. The method as claimed in claim 9, further comprising orienting said second exhaust air opening such that air flows in a direction opposite to the direction of flow of said first exhaust air opening.

* * * * *